united States Patent [19]

Abrams

[11] Patent Number: 5,433,810
[45] Date of Patent: Jul. 18, 1995

[54] LAMINATION OF COMPOSITE EYEGLASS LENSES

[76] Inventor: Herbert M. Abrams, 168 Bennington Hill Ct., West Henrietta, N.Y. 14586

[21] Appl. No.: 197,230

[22] Filed: Feb. 16, 1994

Related U.S. Application Data

[63] Continuation of Ser. No. 945,491, Sep. 16, 1992, abandoned.

[51] Int. Cl.⁶ ............... B24B 13/005; B32B 31/20; B32B 31/28
[52] U.S. Cl. .................... 156/273.7; 156/99; 156/272.2; 156/275.5; 156/275.7; 156/295; 156/379.8; 156/538; 156/539; 156/556; 156/580; 156/583.91; 351/177; 356/127; 451/460
[58] Field of Search ............ 156/99, 103, 106, 272.2, 156/273.7, 275.5, 275.7, 379.8, 538–539, 556, 228, 295, 583.91, 580–581, 583.1, 108–109; 65/37, 42–43; 264/1.1, 1.7, 1.8; 351/159, 177; 269/266; 359/819; 356/127; 51/277; 451/460

[56] References Cited

U.S. PATENT DOCUMENTS

| | | | |
|---|---|---|---|
| 2,394,721 | 2/1946 | Simmons et al. | 156/99 |
| 2,618,200 | 11/1952 | Clave et al. | |
| 2,635,289 | 4/1953 | Owens | 264/1.7 |
| 2,803,884 | 8/1957 | Polley | 351/177 |
| 2,994,166 | 8/1961 | Bardwell et al. | 351/177 |
| 3,322,598 | 5/1967 | Marks et al. | |
| 3,396,214 | 8/1968 | Crandon | 264/1.7 |
| 4,096,023 | 6/1978 | Birens | |
| 4,474,355 | 10/1984 | Greshes | |
| 4,498,919 | 2/1985 | Mann | 65/37 |
| 4,576,623 | 3/1986 | Mann | 65/37 |
| 4,865,670 | 9/1989 | Marks | |
| 4,927,480 | 5/1990 | Vaughan | |

FOREIGN PATENT DOCUMENTS

| | | | |
|---|---|---|---|
| 52-45349 | 9/1977 | Japan | 156/99 |
| 176710 | 10/1984 | Japan | 156/99 |

Primary Examiner—Adrienne Johnstone
Attorney, Agent, or Firm—Eugene Stephens & Associates

[57] ABSTRACT

Front and rear lenses of a composite eyeglass lens are laminated together by holding the front lens in an X, Y adjustable stage on a laminating axis, holding the rear lens in a predetermined position relative to the laminating axis, and moving the two lenses together on the laminating axis to spread an adhesive between them. The rear lens holder is rotatable around the laminating axis and has three pressure feet arranged in a triangle for pressing the rear lens uniformly against the front lens in a process that can be observed by the operator. Then, the adhesive between the pressed-together lenses is cured by UV radiation directed through the front lens before the lenses are removed from the laminator.

35 Claims, 4 Drawing Sheets

LAMINATION OF COMPOSITE EYEGLASS LENSES

RELATED APPLICATIONS

This is a continuation of parent application Ser. No. 07/945,491, filed 16 Sep. 1992, by Herbert M. Abrams, entitled LAMINATION OF COMPOSITE EYEGLASS LENSES, and abandoned upon the filing of this continuation application.

TECHNICAL FIELD

This invention involves lamination or bonding together of front and rear lenses forming a composite eyeglass lens.

BACKGROUND

Composite eyeglass lenses have been formed by bonding together front and rear lenses, as suggested in U.S. Pat. No. 2,618,200. A device and method for accomplishing this has been suggested in U.S. Pat. No. 4,927,480. Generally, the bonding process involves placing a curable adhesive on the concave interface surface of the front lens; pressing the convex interface surface of the rear lens against the adhesive in the front lens, to spread the adhesive throughout the space between the two lenses; and curing the adhesive to bond the lenses together, forming a composite lens, which is then trimmed to fit within an eyeglass frame.

Especially when the desired composite lens includes a cylindrical component that must be properly oriented to correct for astigmatism and a bifocal or progressive focal region that must be properly positioned for reading purposes, the existing methods and equipment have fallen short of the desired optical accuracy. Existing laminating equipment, for example, does not readily accommodate eccentric positioning and bonding of the front and rear lenses, which can be necessary in some cases. Also, existing methods and equipment have been inconvenient to operate and have put the desirable accuracies beyond practical reach for some composite eyeglass lenses.

I have discovered new and better ways of mounting, aligning, and bonding together composite eyeglass lenses to improve on the accuracy attainable. My method, practiced with my preferred apparatus, is also faster and more convenient, is easier to work, and produces fewer defects in bonded composite lenses.

SUMMARY OF THE INVENTION

My composite lens laminating system includes a front lens platform on a movable stage and a rear lens holder that is rotationally adjustable on a laminating axis and is movable along the laminating axis to press the rear lens against the front lens. Accurate positioning of each lens is assured by an X, Y adjustment of the stage holding the front lens platform, by an arrangement of locating pins and pressure feet that register and hold the rear lens on its holder, and rotational adjustment of the rear lens holder on the laminating axis. A simple and effective arrangement assures that the two lenses are pressed together with uniform pressure that spreads the adhesive evenly between them, and this process can be observed through the rear lens while the pressure is being applied. Then, the bonding adhesive is cured while the two lenses are pressed together so that the accuracy of their positioning and the lack of any interruption in the adhesive layer are preserved during the curing process. Several specific procedures and structures contribute to achieving these effects; and the result is fast, effective, and more accurate than previous systems.

DRAWINGS

DETAILED DESCRIPTION

Figure 6:
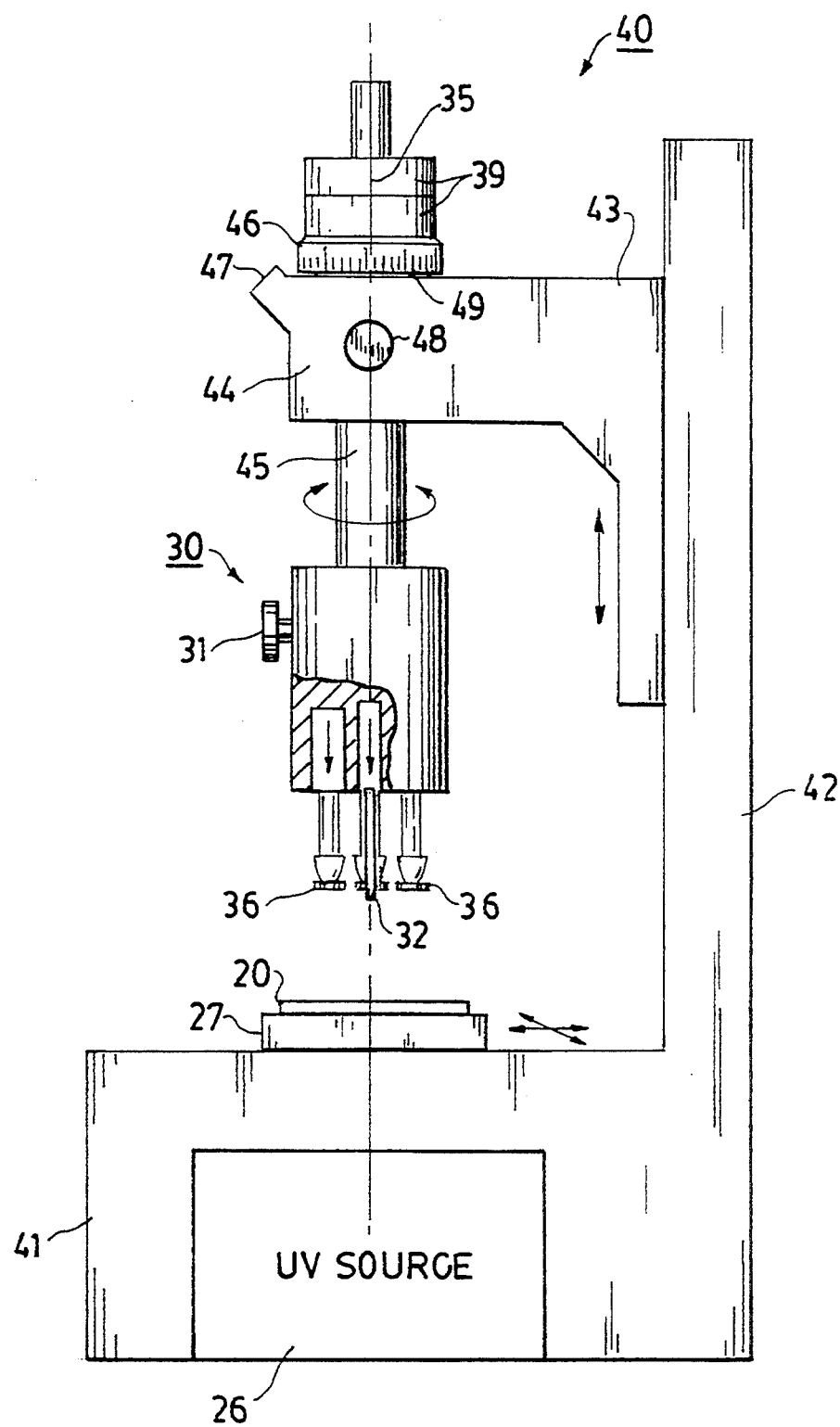
FIG. 6 is a partially schematic, elevational view of a preferred device for laminating composite eyeglass lenses according to my invention.
Figure 7:
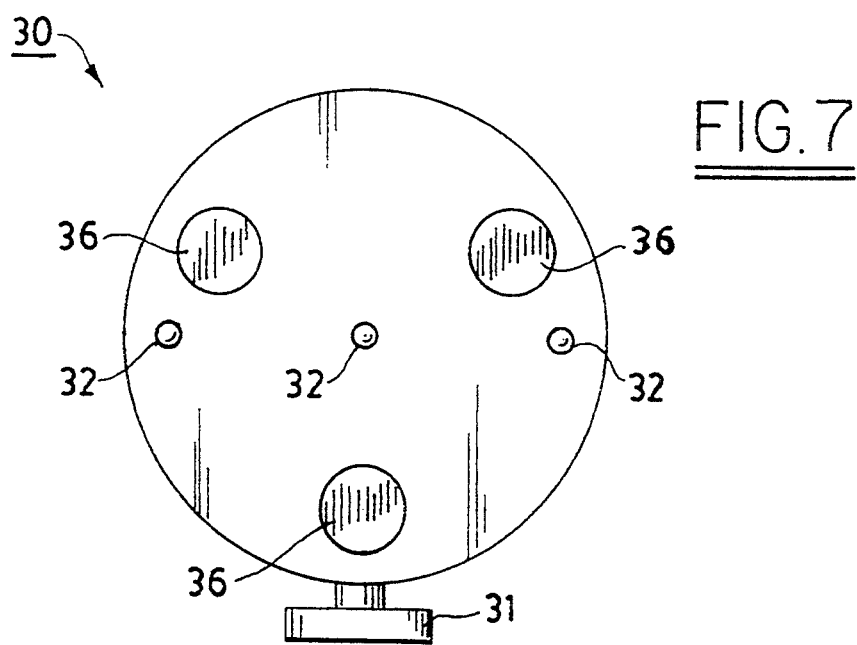
FIG. 7 is a partially schematic, plan view of a rear lens holder detached from the laminator of FIG. 6.
Figure 8:
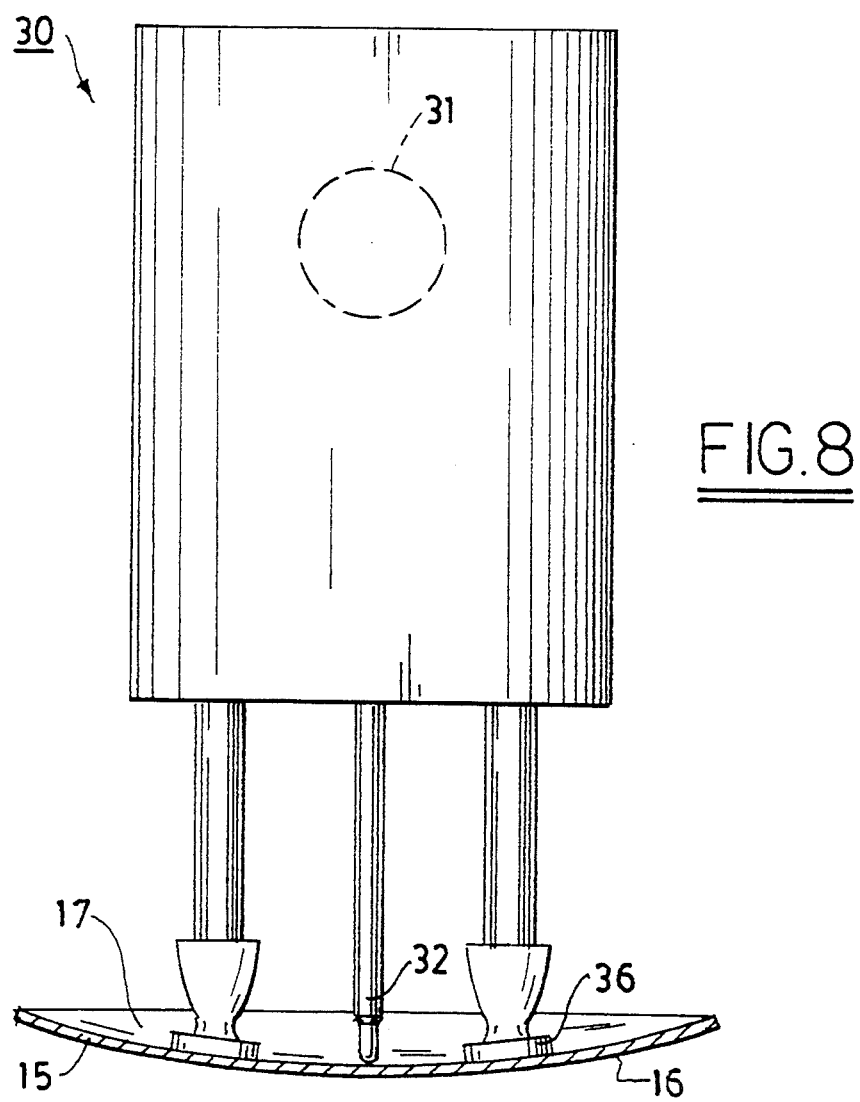
FIG. 8 is a partially schematic and partially cutaway elevational view of the holder of FIG. 7 supporting a rear lens for lamination.

My laminating system aims at accurately bonding together a front lens 10 and a rear lens 15, as shown in FIGS. 1-5. Preferred equipment for doing this is shown in FIGS. 6-8. Lenses 10 and 15 are preferably molded in standard circular shapes with a variety of surface configurations so that a specific pair of a front lens 10 and a rear lens 15 can be bonded together to fulfill the desired optical requirements.

Front lens 10 has a convex front surface 11 supported on a platform 20 and a concave rear interface surface 12. Rear lens 15 has a convex front interface surface 16 and a concave rear surface 17 that is mounted on a holder 30 for laminating purposes. Front lens 10 can include a bifocal region 13, which can also be formed as a progressively variable focal region. Bifocal region 13 is normally below the horizontal and can be variably positioned relative to a horizontal axis 14. I prefer that front lens 10 have a tab or projection 18 extending outward from its otherwise circular periphery and that tab 18 be received in a recess 19 in platform 20 to assure that front lens 10 has its bifocal region 13 properly oriented on platform 20. This is especially desirable for a progressive lens that does not have a clearly visible bifocal region.

As explained more fully below, platform 20 is mounted on a stage 27 that is movable in X and Y directions for proper location of front lens 10 relative to laminating axis 35. This is especially important for positioning bifocal region 13 in a desired location relative to the optical center of the composite lens, which is normally positioned directly in front of the pupil of the eye of the wearer, and is also made to coincide with optical axis 35.

Figure 5:
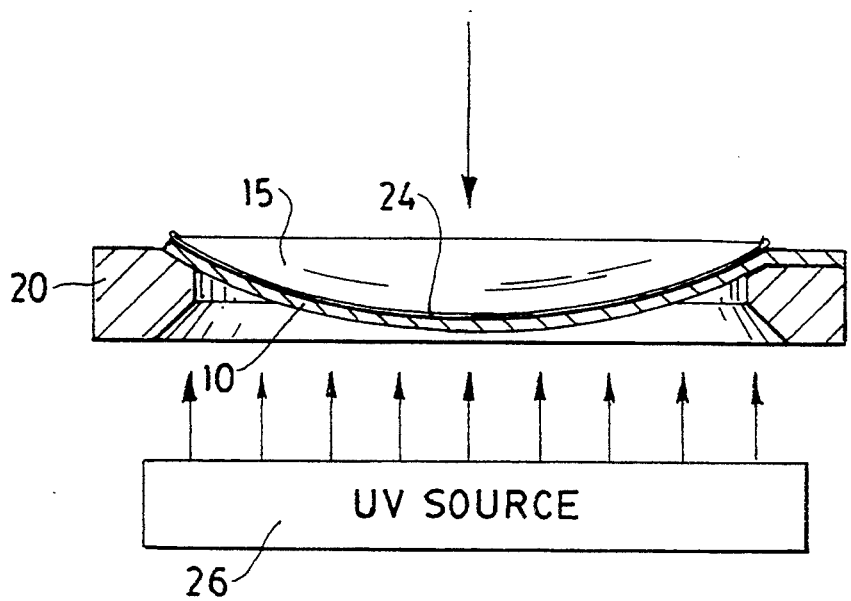

Platform 20 has a circular opening 21 that allows adhesive curing radiation to pass through platform 20 and front lens 10 to cure an adhesive bonding front and rear lenses together, as shown in FIG. 5. While this and the rest of the laminating process occurs, platform 20 supports the periphery of front lens 10 on an angled support surface 22 formed around central opening 21. Platform 20 is preferably invertable and preferably has another support surface 23 formed opposite surface 22 on the other side of platform 20 at a slightly different angle, for supporting a lens 10 with a different curvature of front surface 11. Platform 20 can then be flipped over on its mounting stage to dispose the appropriate one of the support surfaces 22 and 23 for receiving a particular front lens 10.

Rear lens 15 can include an astigmatism correction, and this involves a cylindrical component formed on the rear surface 17 of rear lens 15 along a cylindrical axis 25. Axis 25 must be rotationally oriented relative to front lens 10 to make the appropriate optical correction for the user, and this involves rotationally adjusting rear lens 15 around laminating axis 35. It is also desirable to locate the optical center of rear lens 15 on laminating axis 35 and to position bifocal region 13 of front lens 10 accurately relative to laminating axis 35 so that the optical center of the composite lens coincides with laminating axis 35 and is properly positioned in front of the pupil of the user's eye. How rear lens 15 is properly positioned for bonding to front lens 10 is explained below.

Once properly positioned, rear lens 15 is pressed against front lens 10 with an adhesive 24 interposed between interface surfaces 12 and 16. I prefer that interface surfaces 12 and 16 both be spherical and that they differ slightly in radius to help assure the even spread of adhesive 24 as the interface surfaces are pressed together. Giving interface surface 16 of rear lens 15 a slightly shorter radius of curvature than the radius of curvature of interface surface 12 of front lens 10 makes the engagement between these surfaces begin in their central region and progress toward their peripheries, to ensure even and bubble-free spreading of adhesive 24. The difference in curvature between interface surfaces 12 and 16 is exaggerated in FIG. 4, for illustration purposes, and is preferably less than one-quarter diopter. This is enough, however, to ensure that interengagement of these surfaces proceeds from their centers outward and that adhesive 24 is forced from the center toward the vented peripheries of the interface surfaces and thus spreads evenly without bubbles.

Once the front and rear lenses are pressed together and adhesive 24 is spread evenly between them, as shown in FIG. 5, adhesive 24 is cured while the lenses are held in a pressed-together position. For currently preferred adhesives, curing is accomplished with ultraviolet radiation, as schematically shown by the arrows in FIG. 5 emanating from a UV light source 26. Curing adhesive 24 while lenses 10 and 15 are pressed together assures that their desired interrelationship is maintained in the finished composite lens. Previous laminating systems pressed the lenses together to spread the adhesive between them and then removed the lenses from the pressing apparatus for curing the adhesive elsewhere. This caused defects when the interface surfaces 12 and 16 separated before the adhesive cured. Practical manufacturing tolerances and the flexibility of the lenses themselves allow this problem to occur frequently so that the improperly bonded lenses are discarded and the process is repeated with a new set of lenses.

A preferred laminator 40 for accomplishing the lamination described above is shown in FIGS. 6–8. It includes rear lens holder 30 and front lens platform 20 arranged on laminating axis 35. This is preferably oriented vertically, as assumed in the following description, but could possibly be at other orientations. Laminator 40 otherwise includes a base 41, a platform stage 27 that is movable in X and Y directions, a support 42, a head 43 that is movable vertically on support 42, and a head sleeve 44 supporting a rotationally adjustable and vertically movable column 45. Laminating axis 35 is preferably coaxial with column 45 to provide a reference for properly positioning and orienting the front and rear lenses.

Holder 30 is removable from and reattachable to column 45, preferably by a quickly activated clamp or set screw device 31; and the interconnection between holder 30 and column 45 is preferably configured so that holder 33 mounts in only one angular orientation on column 45. Holder 30 is then rotationally adjustable around laminating axis 35 by rotating column 45 relative to sleeve 44. For this purpose, an angular indicator 46 mounted on column 45 turns relative to a pointer 47 on sleeve 44 so that the desired angular orientation of holder 30 can be indicated and established. This orientation is then held by set screw 48, or other clamping device.

A collar 49 limits downward movement of column 45 relative to sleeve 44, and column 45 and holder 30 are shown in their lowermost position relative to sleeve 44 in the illustration of FIG. 6. As lamination occurs, head 43 is lowered on support 42 until rear lens 15, carried on holder 30, presses against front lens 10, carried on platform 20. I prefer that gravity be used to provide the pressure forcing the lenses together; and this is accomplished by using the weight of holder 30, column 45, and an adjustable series of weights 39 stacked on column 45 above collar 49. Then, it is only necessary to lower head 43 far enough so that the resistance of a front lens 10 on platform 20 stops the downward movement of holder 30 and lets sleeve 44 move downward on column 45 below collar 49. Once this occurs, head 43 need not be lowered any further, because the weight of column 45 and holder 30, together with a preselected number of weights 39, then provides the downward force applied to press the lenses together. This is preferably on the order of a few pounds. It is also simpler and more reliable than pneumatic, hydraulic, or spring mechanisms, which might be used to produce a corresponding force pressing the front and rear lenses together.

The proper mounting of rear lens 15 on holder 30 is preferably done with the aid of three alignment or registration pins 32 arranged along a line 25 parallel with the cylindrical axis of rear lens 15. Three pressure feet 36 are arranged on holder 30 to engage the concave rear surface 17 of rear lens 15, to support lens 15 in a proper position on laminating axis 35, and to properly apply pressure forcing rear lens 15 against front lens 10 for bonding purposes. The mounting of rear lens 15 on holder 30 is preferably done while holder 30 is removed from column 45. Holder 30 is then oriented with pressure feet 36 and alignment pins 32 extending upward so that an operator can place rear lens 15 down onto pressure feet 36. These are covered with an adhesive material or a double-sided adhesive tape arranged so that rear lens 15 can be stuck onto pressure feet 36 and held adhesively until laminated to front lens 10. Then the composite lens can be pulled away from the adhesive on pressure feet 36.

Before mounting rear lens 15, the operator examines rear lens 15 with a lensometer that makes three removable ink marks on rear lens 15. The three ink marks are aligned, with the center mark being on the optical center of lens 15, and the line of the three marks being parallel with the cylindrical axis of lens 15.

The three locator pins 32 are arranged on head 30 to register with the three ink marks so that the operator can place rear lens 15 properly on holder 30 by registering the three ink marks with the points of registration pins 32. These are spring biased by a light spring pressure, as schematically shown in FIG. 6, so that once the ink marks are aligned with registration pins 32, it is merely necessary to press rear lens 15 against pressure feet 36. This adhesively tacks rear lens 15 to feet 36, with registration pins 32 retracted against their spring bias. Pressure feet 36 preferably have pivotally mounted ends that can accommodate to different curvatures of the rear surfaces 17 of different rear lenses 15; and pressure feet 36 are also preferably spring biased, again as schematically illustrated in FIG. 6, to adjust to the curvature of lens 15 as is pressed against lens 10.

Pressure feet 36 are preferably arranged in a triangle as illustrated, with a line between two of the feet 36 being parallel with registration pins 32 and the cylindrical axis of rear lens 15. The remaining pressure foot 36 is preferably arranged across the line of locator pins 32, and thus across the cylindrical axis from the other two pressure feet. The cylindrical component of rear lens surface 17 forms a slight trough extending along the line of pins 32. I prefer keeping pressure feet 36 out of this trough, and I prefer positioning pressure feet 36 so that two of the feet are close to the cylindrical component and parallel with it and the other foot is across the cylindrical component and farther from the cylindrical component, to afford an optimum three-point support. Such an arrangement of pressure feet allows a rear lens to be pressed against the front lens with uniformly distributed pressure, in spite of the cylindrical component formed in the curvature of the rear surface 17 of the rear lens 15.

Figure 1:
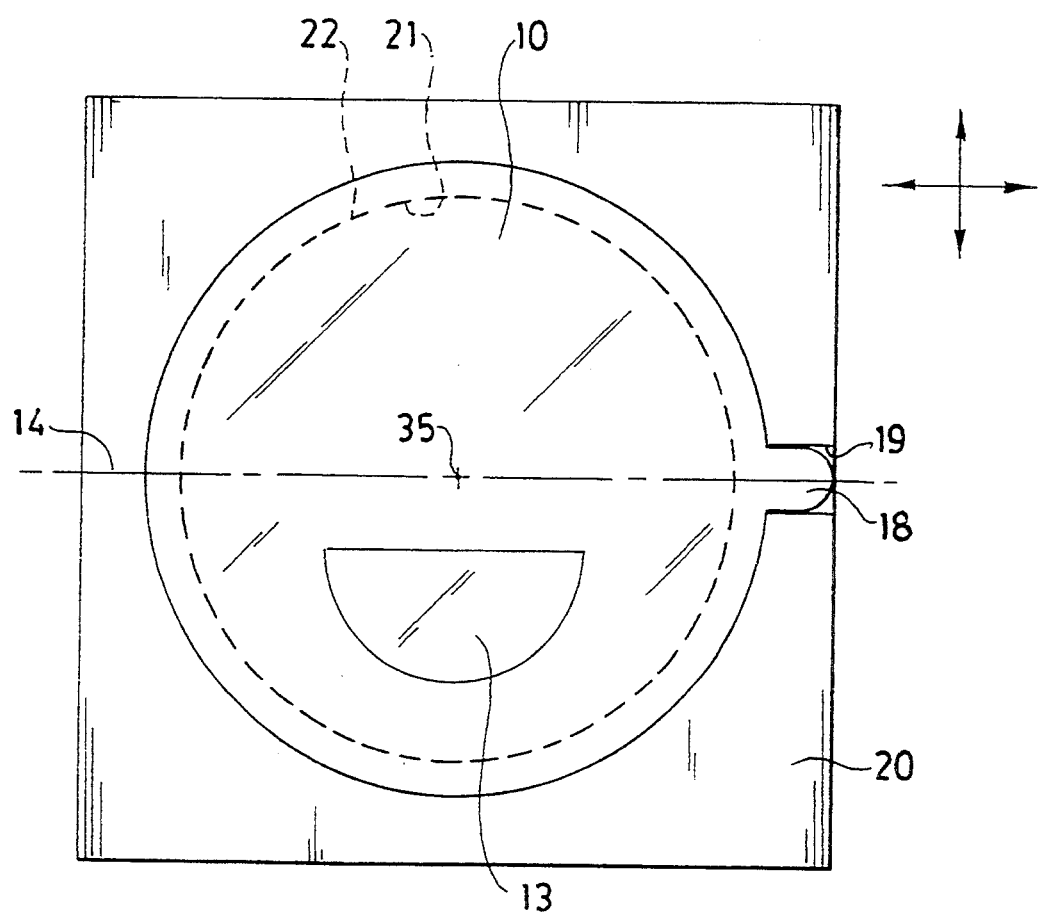
FIG. 1 is a plan view of a platform supporting a front lens for lamination according to my invention.
Figure 2:
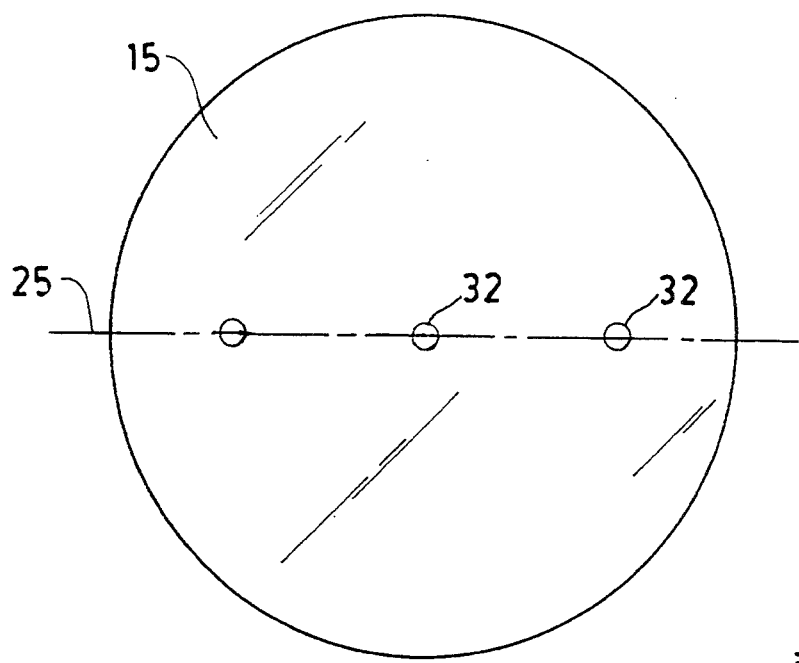
FIG. 2 is a plan view of a rear lens marked for positioning and bonding to the front lens.
Figure 3:
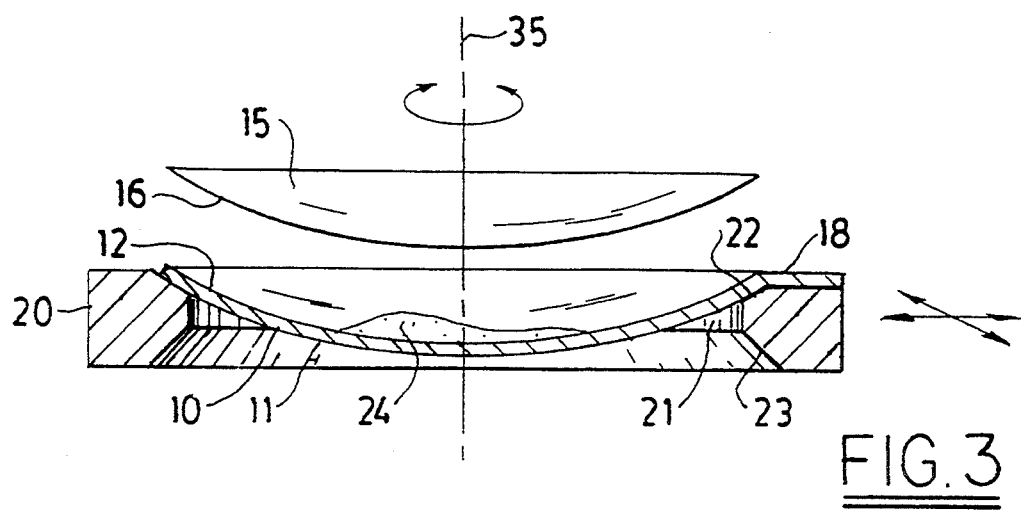
FIGS. 3-5 are partially schematic and partially cutaway views of the front lens and platform of FIG. 1 and the rear lens of FIG. 2 being pressed together for laminating purposes.
Figure 4:
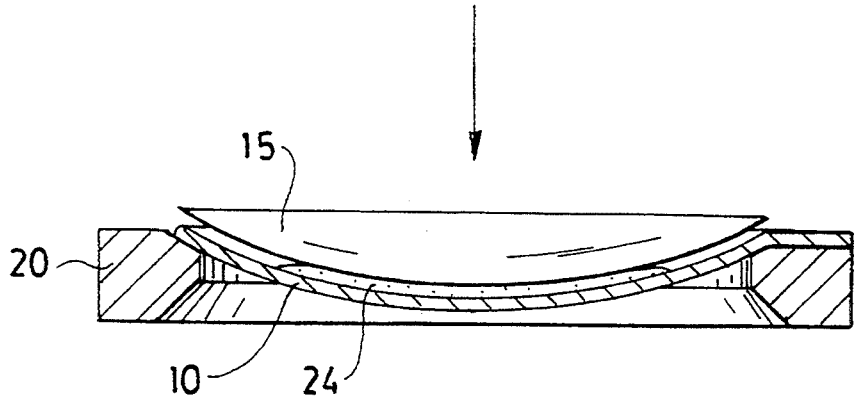

Once rear lens 15 is properly positioned on holder 30, as shown in FIG. 8, holder 30 is reclamped onto column 45. Then, holder 30 is turned to the desired angular orientation on axis 35 and is clamped in rotational place in this orientation. Then, adhesive 24 is applied to the concave interface surface 12 of front lens 10, and head 43 is lowered to move holder 30 downward and bring the lenses into initial contact, as shown in FIG. 4. The operator continues lowering head 43, while observing through rear lens 15 that adhesive 24 is flowing uniformly, without bubbles, toward the peripheries of the lenses. The spacing of pressure feet 36 allows room for this observation. Lowering of head 43 also removes the support of sleeve 44 from under collar 49 so that the gravitational weight of column 45, with head 30 and weights 39, presses the lenses together in their final position, illustrated in FIG. 5. If adhesive 24 appears to be free of bubbles and extends to the peripheries of the lenses (which need not be concentric), then the adhesive can be cured while the lenses are pressed together in laminator 40. This is preferably done by opening a shutter admitting curing radiation from UV source 26 to pass upwardly through front lens 10. Laminator 10 is preferably enclosed while this occurs.

After adhesive 24 is cured, the curing light is blocked from platform 20 and head 43 is raised to move holder 30 upward, bringing the bonded composite lens with it. This is removed by pulling the lens free of the adhesive on pressure feet 36. The composite lens is later trimmed to fit a specific eyeglass frame.

I claim:

1. A method of laminating front and rear lenses to form a composite eyeglass lens, said method comprising:
   a. holding a front face of the front lens in a mounting aperture positioned relative to a laminating axis;
   b. mounting a rear face of the rear lens in a predetermined position on a holder that is movable along said laminating axis and holds the rear lens independently of the front lens;
   c. rotatably orienting the holder relative to said axis to bring the rear lens into a desired angular relationship with the front lens while the rear lens is separated from the front lens;
   d. placing a bonding material on a rear face of the front lens and moving the holder to bring a front face of the rear lens into engagement with the bonding material and to press the rear lens against the front lens in the direction of the laminating axis to force the bonding material to spread throughout a space between the two lenses; and
   e. curing the bonding material by directing curing radiation through the front lens while pressing and holding the rear lens against the front lens.

2. The method of claim 1 including using the weight of the holder for moving the holder to press and hold said rear lens against said front lens.

3. The method of claim 1 including using adhesive to hold said rear lens on said holder.

4. The method of claim 1 including observing the spread of said bonding material by looking through said rear lens before directing said curing radiation through said front lens.

5. A method of positioning a front lens and a rear lens relative to each other and for laminating said lenses together to form a composite eyeglass lens, said method comprising:
   a. positioning said front lens on a platform on an adjustable stage and adjusting said stage to position said front lens relative to a laminating axis;
   b. positioning said rear lens on a holder that is movable on the laminating axis and engages and holds onto a rear face of the rear lens to support the rear lens independently of the front lens;
   c. angularly positioning said holder on said laminating axis to orient said rear lens relative to said front lens while the rear lens is separated from the front lens; and
   d. moving said rear lens into engagement with said front lens and pressing and holding said rear lens against said front lens while curing a bonding material that laminates said lenses together.

6. The method of claim 5 including using the weight of said holder for moving said holder downward to press and hold said rear lens against said front lens.

7. The method of claim 5 including observing the spread of adhesive between said lenses by viewing through said rear lens.

8. The method of claim 5 including curing said adhesive by directing curing radiation through said front lens.

9. A composite eyeglass lens laminator comprising:
   a. a front lens supporting platform arranged on a movable stage for moving the platform and a front lens on said platform in a plane perpendicular to a laminating axis to bring the front lens into a predetermined position on the laminating axis;
   b. a holder for holding onto a rear face of a rear lens, said holder having a positioning system for mounting the rear face of the rear lens in a desired position on said holder while said rear lens is separated from said front lens;

c. said holder being angularly adjustable on said axis for rotationally orienting said rear lens relative to said front lens while said rear lens is separated from said front lens; and d. said holder being movable along said axis so that movement of said holder brings said rear lens into a desired positional engagement with said front lens and presses said rear lens against said front lens in a predetermined relationship.

10. The laminator of claim 9 wherein said axis is vertical, and weight of said holder is used for the movement that presses said rear lens against said front lens.

11. The laminator of claim 9 wherein said holder is removable from said axis for mounting said rear lens and is replaceable on said axis for orienting said rear lens.

12. The laminator of claim 9 wherein said holder has support feet that engage and hold the rear face of said rear lens.

13. The laminator of claim 9 including a source for directing curing radiation through the front lens to cure an adhesive between the lenses.

14. The laminator of claim 9 including a sleeve supporting a column movable on said axis, said holder being mounted on said column.

15. The laminator of claim 14 wherein said holder is removable from said column for mounting said rear lens on said holder.

16. The laminator of claim 14 including a collar for limiting downward movement of said column relative to said sleeve.

17. The laminator of claim 14 wherein the weight of said column and said holder is used for the movement that presses said rear lens against said front lens.

18. The laminator of claim 9 wherein said platform is removable from said stage and has a circular opening configured for receiving said front lens.

19. The laminator of claim 18 wherein opposite faces of said platform have differently angled surfaces around said circular opening for receiving front lenses with different convex curvatures.

20. The laminator of claim 18 wherein said platform has a recess for receiving a tab extending outward from a circular periphery of said front lens for orienting said front lens in said platform.

21. A composite eyeglass lens laminator comprising:
a. a platform having a circular through opening configured for supporting a periphery of a front face of a front lens;
b. a holder for holding onto a rear face of a rear lens to support said rear lens while said rear lens is separated from said front lens, said holder being angularly adjustable relative to said platform for angularly adjusting said rear lens relative to said front lens;
c. a source for directing curing radiation through said opening in said platform; and
d. an arrangement for moving said holder toward said platform for pressing said rear lens into engagement with said front lens after said rear lens is angularly adjusted relative to said front lens and for holding said rear lens against said front lens while said curing radiation passes through said front lens and cures an adhesive between said lenses.

22. The laminator of claim 21 wherein said holder moving arrangement moves said holder downward using the weight of said holder.

23. The laminator of claim 21 wherein said holder holds said rear lens on pressure feet allowing an operator to observe said adhesive between said lenses as said rear lens is pressed against said front lens.

24. The laminator of claim 21 wherein said platform is arranged on a movable stage that can adjust the position of said front lens relative to a laminating axis.

25. The laminator of claim 24 wherein said rear lens is mountable on said holder in a predetermined position, and said holder is movable along said axis toward said front lens.

26. The laminator of claim 21 wherein said platform is invertable and has different inclines around said circular opening for supporting front lenses with different convex curvatures.

27. The laminator of claim 21 wherein said platform has a recess communicating with said circular opening for receiving a tab projecting outward from a circular perimeter of said front lens.

28. The laminator of claim 27 wherein said recess in said platform is oriented relative to a laminating axis for positioning a secondary focal region of said front lens relative to said laminating axis.

29. The laminator of claim 28 wherein said platform is invertable, and said circular surface is formed on opposite sides of said platform for receiving different convex curvatures of said front lens.

30. The laminator of claim 29 wherein said laterally extending recess is formed on each opposite side of said platform.

31. In a laminator for laminating composite eyeglass lenses by pressing together a front lens, a rear lens, and an interposed adhesive, the improvement comprising:
a. a platform configured for receiving and holding said front lens;
b. said platform having a circular surface matching a circular periphery of said front lens;
c. said platform having a recess extending from and communicating laterally with said circular surface for receiving a tab projecting laterally from said circular periphery of said front lens; and
d. said laterally extending recess in said platform being oriented relative to a laminating axis for positioning a secondary focal region of said front lens relative to said laminating axis.

32. The improvement of claim 31 wherein said platform is mounted on a stage that is adjustable relative to said laminating axis.

33. The improvement of claim 31 wherein said platform is invertable, and said circular surface is formed on opposite sides of said platform for receiving different convex curvatures of said front lens.

34. The improvement of claim 33 wherein said laterally extending recess is formed on each opposite side of said platform.

35. The improvement of claim 31 wherein said platform has a circular opening within said circular surface.

* * * * *